US008451795B2

(12) United States Patent
Ho et al.

(10) Patent No.: US 8,451,795 B2
(45) Date of Patent: May 28, 2013

(54) HANDOVER IN A WIRELESS DATA PACKET COMMUNICATION SYSTEM THAT AVOID USER DATA LOSS

(75) Inventors: Sai Yiu Duncan Ho, San Diego, CA (US); Arnaud Meylan, San Diego, CA (US); Peter Anthony Barany, San Diego, CA (US); Francesco Grilli, La Jolla, CA (US); Nathan Edward Tenny, Poway, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 826 days.

(21) Appl. No.: 12/187,255

(22) Filed: Aug. 6, 2008

(65) Prior Publication Data

US 2009/0040982 A1 Feb. 12, 2009

Related U.S. Application Data

(60) Provisional application No. 60/954,797, filed on Aug. 8, 2007.

(51) Int. Cl.
*H04W 36/02* (2009.01)
(52) U.S. Cl.
USPC .......................................... 370/331; 455/436
(58) Field of Classification Search
None
See application file for complete search history.

(56) References Cited

U.S. PATENT DOCUMENTS

| 7,809,373 | B2 * | 10/2010 | Park et al. ...................... 455/436 |
| 7,920,866 | B2 * | 4/2011 | Bosch et al. ................... 455/436 |
| 7,957,349 | B2 * | 6/2011 | Kim et al. ...................... 370/331 |
| 2002/0172208 | A1 | 11/2002 | Malkamaki | |
| 2004/0081119 | A1 | 4/2004 | Zhong et al. | |
| 2006/0126567 | A1 | 6/2006 | Chao et al. | |
| 2007/0291695 | A1 * | 12/2007 | Sammour et al. ............. 370/331 |
| 2008/0254800 | A1 * | 10/2008 | Chun et al. .................... 455/438 |

FOREIGN PATENT DOCUMENTS

| EP | 1519519 A1 | 3/2005 |
| WO | WO2007052922 A1 | 5/2007 |

OTHER PUBLICATIONS

3GPP TSG-RAN WG2#50 (R2-060053), Jan. 9-13, 2006, pp. 1-3.*
International Search Report and the Written Opinion—PCT/US2008/072705 International Search Authority—European Patent—Dec. 19, 2008.

* cited by examiner

*Primary Examiner* — Alex Skripnikov
(74) *Attorney, Agent, or Firm* — Eric Ho; John J. Ketchum (57) ABSTRACT

An apparatus, method, processor(s), and computer program product avoids user data loss by network-controlled, user equipment assisted handover in a wireless data packet communication system. A wireless receiver receives radio link control (RLC) packet data units (PDUs) from user equipment (UE) being served by a source node. A wireless transmitter commands the UE to handover. A network communication interface transmits RLC Uplink (UL) context from the source node to the target node, and transmits RLC Downlink (DL) initialization message and buffered in-transit DL RLC PDUs from the source node to the target node.

17 Claims, 7 Drawing Sheets

HANDOVER IN A WIRELESS DATA PACKET COMMUNICATION SYSTEM THAT AVOID USER DATA LOSS

CLAIM OF PRIORITY UNDER 35 U.S.C. §119

The present application for patent claims priority to Provisional Application No. 60/954,797 entitled "Methods and Apparatuses for Handover Procedure With Relocation Of The RLC Entity From Source eNode B To Target eNode B Without Reset Or Re-Establishment Of The RLC Entities" filed Aug. 8, 2007, and assigned to the assignee hereof and hereby expressly incorporated by reference herein.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

3GPP Long-term evolution (LTE) complements the success of High Speed Packet Access (HSPA) with higher peak data rates, lower latency and an enhanced broadband experience in high-demand areas. This is accomplished with the use of wider-spectrum bandwidths, Orthogonal Frequency-Division Multiple Access (OFDMA) and SC-FDMA (i.e., single carrier) air interfaces, and advanced antenna techniques. These techniques enable high spectral efficiency and an excellent user experience for a wide range of converged IP services. UMTS operators are rapidly adopting and offering IP services such as rich multimedia (e.g., video-on-demand, music download, video sharing), VoIP, PTT and broadband access to laptops and PDAs. Operators offer these services through access networks such as HSPA, HSPA+ and LTE.

In LTE as described in 3GPP TS 36.300 technical specification for EU-TRAN, one serving evolved base node (eNB) communicates via an uplink (UL) and downlink (DL) channel with user equipment (UE), thereby providing legacy interoperability by not depending upon dual mode communications. Due to data traffic, channel characteristics, or mobility of UE, a need frequently arises for a particular UE to be handed over from a source eNB to a target eNB. A handover (HO) procedure for a wireless communication system supports handover. As implemented, a degree of simplicity and economy in use of Over-the-Air (OTA) resources was sought by having the Radio Link Control (RLC) reset. However, for whatever OTA resources are preserved by not transferring RLC context, to achieve lossless user data during handover, context has to be transferred for a higher Packet Data Convergence Protocol (PDCP) layer, which performs header compression and ciphering on IP packets. In particular, in order to resend a small amount of data segmented by the RLC layer that is lost on either the UL or DL during RLC reset, a complete (larger) PDCP PDU has to be resent consuming OTA resources. In addition, PDCP layer performs PDCP PDU re-ordering during handover while RLC layer performs in-order delivery during other times, creating duplicating functionality between the two protocols. Further, upper layer functionality such as a TCP/IP transmission window collapse upon detection of packet loss. It should further be appreciated that during handover there is an interruption in UL user data since UE user data received on the UL by the target eNB cannot be routed to the Access Gateway (AGW) until a new S1 interface between the AGW and the target eNB is established.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a handover of user equipment (UE) from a source evolved base node (eNB) to a target eNB. In particular, Radio Link Control (RLC) layer is not reset during handover, ensuring that RLC recovers all missing RLC PDUs without depending upon the higher Packet Data Convergence Protocol (PDCP) layer to retransmit a larger PDCP packet data unit (PDU). In addition, RLC status and RLC PDUs for downlink (DL) packets are forwarded from the source to target eNB. Further, RLC status for uplink (UL) are forwarded from the source to target eNB, thereby enabling UL PDCP PDUs to be routed to the Access Gateway (AGW) even before a new S1 interface is established between the AGW and the target eNB. Thereby, lossless user data is maintained without undue delay that would otherwise have detrimental effects on upper layers.

In one aspect, a method for network controlled handover in a wireless data packet communication system to avoid user data loss. In a first session when a first user equipment (UE) is being served by a first node acting as source node that is to be handed over to a second node acting as target node, a handover command is sent from the first node to the first user equipment (UE). RLC Uplink (UL) context is transmitted from the first node to the second node. In-transit DL RLC PDUs are transmitted from the first node to the second node.

In another aspect, at least one processor performs network controlled handover in a wireless data packet communication system to avoid user data loss. A first module, in a first session when a first user equipment (UE) is being served by a first node acting as source node that is to be handed over to a second node acting as target node, sends a handover command from the first node to the first user equipment (UE). A second module transmits RLC Uplink (UL) context from the first node to the second node. A third module transmits RLC Downlink (DL) initialization message and buffered in-transit DL RLC PDUs from the first node to the second node.

In an additional aspect, a computer program product performs network controlled handover in a wireless data packet communication system to avoid user data loss. A computer-readable storage medium comprises a first set of codes for causing a computer, in a first session when a first user equipment (UE) is being served by a first node acting as source node that is to be handed over to a second node acting as target node, to send a handover command from the first node to the first user equipment (UE). A second set of codes causes the computer to transmit RLC Uplink (UL) context from the first node to the second node. A third set of codes causes the computer to transmit RLC Downlink (DL) initialization message and buffered in-transit DL RLC PDUs from the first node to the second node.

In another additional aspect, an apparatus performs network controlled handover in a wireless data packet communication system to avoid user data loss. Means are provided for, in a first session when a first user equipment (UE) is being served by a first node acting as source node that is to be handed over to a second node acting as target node, sending a handover command from the first node to the first user equipment (UE). Means are provided for transmitting RLC Uplink (UL) context from the first node to the second node. Means are provided for transmitting RLC Downlink (DL) initialization message and buffered in-transit DL RLC PDUs from the first node to the second node.

In a further aspect, an apparatus performs network controlled handover in a wireless data packet communication system to avoid user data loss. A wireless transmitter, in a first session when a first user equipment (UE) is being served by a first node acting as source node that is to be handed over to a second node acting as target node, sends a handover command from the first node to the first user equipment (UE). A network communication interface transmits RLC Uplink (UL) context from the first node to the second node, and for transmitting RLC Downlink (DL) initialization message and buffered in-transit DL RLC PDUs from the first node to the second node.

In yet one aspect, a method performs user equipment assisted handover in a wireless data packet communication system to avoid user data loss. A user equipment (UE) synchronizes to a target node in response to receiving a handover command from a serving source node. An RLC status report is received over-the-air from the target node based upon RLC Uplink (UL) context previously transmitted from the source node to the target node. In-transit RLC PDUs are received from the target node previously transmitted from the source node to the target node based upon RLC Downlink (DL) initialization message.

In yet another aspect, at least one processor performs user equipment assisted handover in a wireless data packet communication system to avoid user data loss. A first module synchronizes a user equipment (UE) to a target node in response to receiving a handover command from a serving source node. A second module receives over-the-air an RLC status report from the target node based upon RLC Uplink (UL) context previously transmitted from the source node to the target node. A third module receives in-transit RLC PDUs from the target node previously transmitted from the source node to the target node based upon RLC Downlink (DL) initialization message.

In yet an additional aspect, a computer program product performs user equipment assisted handover in a wireless data packet communication system to avoid user data loss. A computer-readable storage medium comprises a first set of codes for causing a computer to synchronize a user equipment (UE) to a target node in response to receiving a handover command from a serving source node. A second set of codes causes the computer to receive over-the-air an RLC status report from the target node based upon RLC Uplink (UL) context previously transmitted from the source node to the target node. A third set of codes causes the computer to receive in-transit RLC PDUs from the target node previously transmitted from the source node to the target node based upon RLC Downlink (DL) initialization message.

In yet another additional aspect, an apparatus performs user equipment assisted handover in a wireless data packet communication system to avoid user data loss. Means are provided for synchronizing a user equipment (UE) to a target node in response to receiving a handover command from a serving source node. Means are provided for receiving over-the-air an RLC status report from the target node based upon RLC Uplink (UL) context previously transmitted from the source node to the target node. Means are provided for receiving in-transit RLC PDUs from the target node previously transmitted from the source node to the target node based upon RLC Downlink (DL) initialization message.

In yet a further aspect, an apparatus performs user equipment assisted handover in a wireless data packet communication system to avoid user data loss. A wireless receiver synchronizes a user equipment (UE) to a target node in response to receiving a handover command from a serving source node, receives over-the-air an RLC status report from the target node based upon RLC Uplink (UL) context previously transmitted from the source node to the target node, and receives in-transit RLC PDUs from the target node previously transmitted from the source node to the target node based upon RLC Downlink (DL) initialization message.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

A hard handover (HO) system for a wireless communication system supports handover of user equipment (UE) when moving from an area covered by one evolved base node (eNB) to another eNB in accordance with 3GPP LTE (Third Generation Partnership Project Long Term Evolution) protocols. In particular, Radio Link Control (RLC) layer is not reset during handover, ensuring that RLC recovers all missing RLC PDUs without depending upon the higher Packet Data Convergence Protocol (PDCP) layer to retransmit a larger PDCP packet data unit (PDU). In addition, RLC status and RLC PDUs for downlink (DL) packets are forwarded from the source to target eNB. Further, RLC status for uplink (UL) are forwarded from the source to target eNB, thereby enabling UL PDCP PDUs to be routed to the Access Gateway (AGW) even before a new S1 interface is established between the AGW and the target eNB. Thereby, lossless user data is maintained without undue delay that would otherwise have detrimental effects on upper layers, for instance avoiding collapse of a TCP/IP transmission window by preventing packet losses.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. or may not include all of the components, modules, etc. discussed in connection with the figures. A combination of these approaches may also be used. The various aspects disclosed herein can be performed on electrical devices including devices that utilize touch screen display technologies or mouse-and-keyboard type interfaces. Examples of such devices include computers (desktop and mobile), smart phones, personal digital assistants (PDAs), and other electronic devices both wired and wireless.

Figure 1:
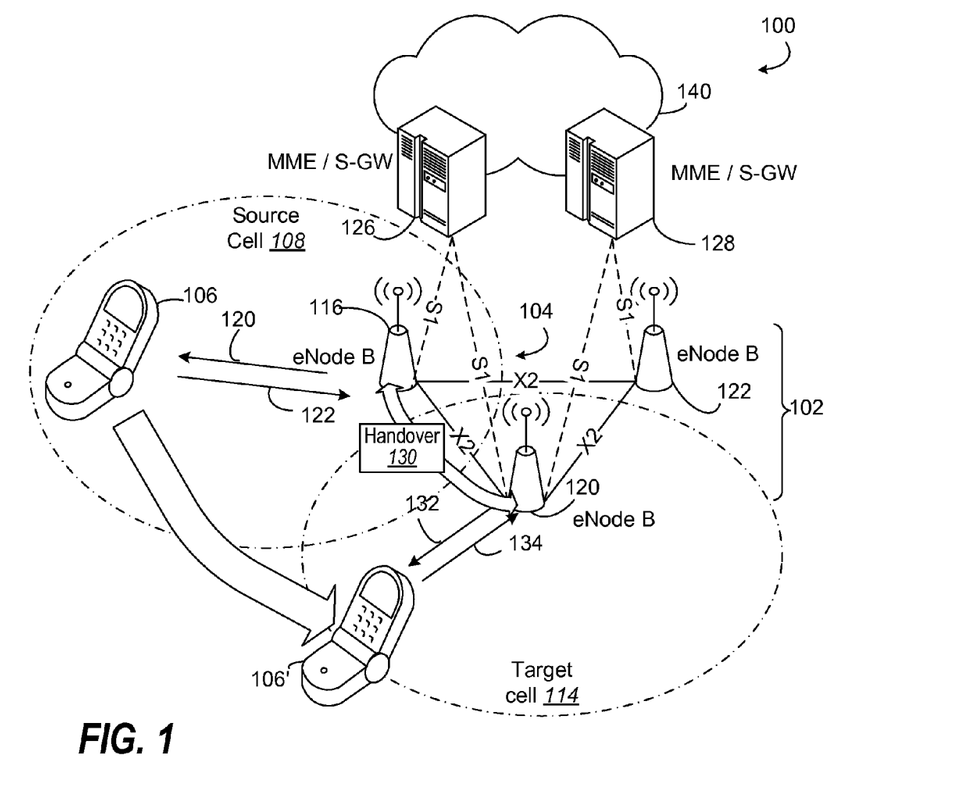
FIG. 1 illustrates a block diagram of a wireless communication system of a user equipment (UE) moving from a coverage area of source radio access network (RAN) to a neighboring RAN warranting a handover.

Referring initially to FIG. 1, in one aspect, a communication system 100 includes an evolved Universal Mobile Telecommunications System (UMTS) Terrestrial Radio Access Network (E-UTRAN) 102 that incorporates a handover (HO) system 104 for a wireless communication system supports handover of user equipment (UE) 106 when moving as depicted at 106' from an area covered (cell) 108 by one evolved base node (eNB) 110 to another eNB 111 that provides a cell 114, as depicted at 106', in accordance with 3GPP LTE (Third Generation Partnership Project Long Term Evolution) protocols.

The eNode Bs 110-112 provide an UMTS Terrestrial Radio Access (E-UTRA) user plane and control plane (RRC) protocol terminations towards the UE 106. The user plane can comprise of 3GPP (3rd Generation Partnership Project) Packet Data Convergence Protocol (PDCP), radio link control (RLC), medium access control (MAC) and physical layer control (PHY). The eNode B 110-112 are interconnected with each other by means of X2 interface ("X2"). The eNode Bs 110-112 are also connected by means of an S1 interface ("S1") to an EPC (Evolved Packet Core), more specifically to Mobility Management Entities/Serving Gateways (MME/S-GW) 116, 118 connected to a data packet network 120. The S1 interface supports a many-to-many relation between MMEs/S-GW 116, 118 and eNode Bs 110-112. A distributed network function depicted as a hardover component 130 between eNodeBs 110-111 utilizes the network interface X2 to control the handover of eNodeB without reset of RLC so that a new DL 132 and UL 134 in cell 114 can be achieved, completing delivery of in-transit PDUs and without loss of user data.

The eNode Bs 110-112 hosts the following functions: radio resource management: radio bearer control, radio admission control, connection mobility control, dynamic allocation of resources to UEs in both uplink and downlink (scheduling); IP header compression and encryption of user data stream; selection of an MME at UE attachment; routing of user plane data towards serving gateway; scheduling and transmission of paging messages (originated from the MME); scheduling and transmission of broadcast information; and measurement and measurement reporting configuration for mobility and scheduling.

The MME hosts the following functions: distribution of paging messages to the eNode Bs 110-112; security control; idle state mobility control; System Architecture Evolution (SAE) bearer control; ciphering and integrity protection of Non-Access Stratum (NAS) signaling. The Serving Gateway hosts the following functions termination of U-plane packets for paging reasons and switching of U-plane for support of UE mobility.

A first over-the-air (OTA) downlink (DL) 122 from the eNode B 106 can include a plurality of communication channels relevant to download allocation. Three different types of physical (PHY) channels are defined for the LTE downlink 122. One common characteristic of physical channels is that they all convey information from higher layers in the LTE stack. This is in contrast to physical signals, which convey information that is used exclusively within the PHY layer.

LTE DL physical channels are Physical Downlink Shared Channel (PDSCH), Physical Downlink Control Channel (PDCCH), and Common Control Physical Channel (CCPCH). Physical channels map to transport channels, which are service access points (SAPs) for the L2/L3 layers. Each physical channel has defined algorithms for bit scrambling, modulation, layer mapping, cyclic delay diversity (CDD) preceding, resource element assignment; layer mapping and pre-coding are related to MIMO applications. A layer corresponds to a spatial multiplexing channel.

A Broadcast Channel (BCH) has a fixed format and is broadcast over an entire coverage area of a cell. A Downlink Shared Channel (DL-SCH) supports Hybrid ARQ (HARQ), supports dynamic link adaption by varying modulation, coding and transmit power, is suitable for transmission over entire cell coverage area, is suitable for use with beamforming, supports dynamic and semi-static resource allocation, and supports discontinuous receive (DRX) for power save. A Paging Channel (PCH) supports UE DRX, requires broadcast over entire cell coverage area, and is mapped to dynamically allocated physical resources. A Multicast Channel (MCH) is required for broadcast over entire cell coverage area, supports Multicast/broadcast—single frequency network (MB-SFN), supports semi-static resource allocation. Supported transport channels are Broadcast channel (BCH), Paging channel (PCH), Downlink shared channel (DL-SCH), and Multicast channel (MCH). Transport channels provide the following functions: structure for passing data to/from higher layers, a mechanism by which higher layers can configure the PHY status indicators (packet error, CQI etc.) to higher layers, and support for higher-layer peer-to-peer signaling. Transport channels are mapped to physical channels as follows: BCH maps to CCPCH, although mapping to PDSCH under consideration. PCH and DL-SCH map to PDSCH. MCH may be mapped to PDSCH.

A higher-level protocol or application of the transmitter (e.g., eNB 110 for DL 122 or the UE 106 for an uplink (UL) 124) has content for communication such as Internet Protocol (IP) packets that are transferred as a service data unit (SDU) to an upper level protocol, such as a Packet Data Convergence Protocol (PDCP) for functions such as ciphering that produces packet data units (PDUs). The PDCP transports the PDUs as service data units (SDUs) to a service access point of a lower layer protocol, such as a Radio Link Layer (RLC).

The PDCP 114 and the RLC 126 are adjacent protocols in the 'layer two' of a telecommunication system that, among other things enable ARQ (Automatic Repeat re-Quest) as for example the RLC of HSPA and the RLC of LTE in 3GPP. Furthermore, aspects and techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA is part of Universal Mobile Telecommunication System (UMTS). E-UTRA is part of the 3GPP Long Term Evolution, an upcoming release of 3GPP, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Figure 2:
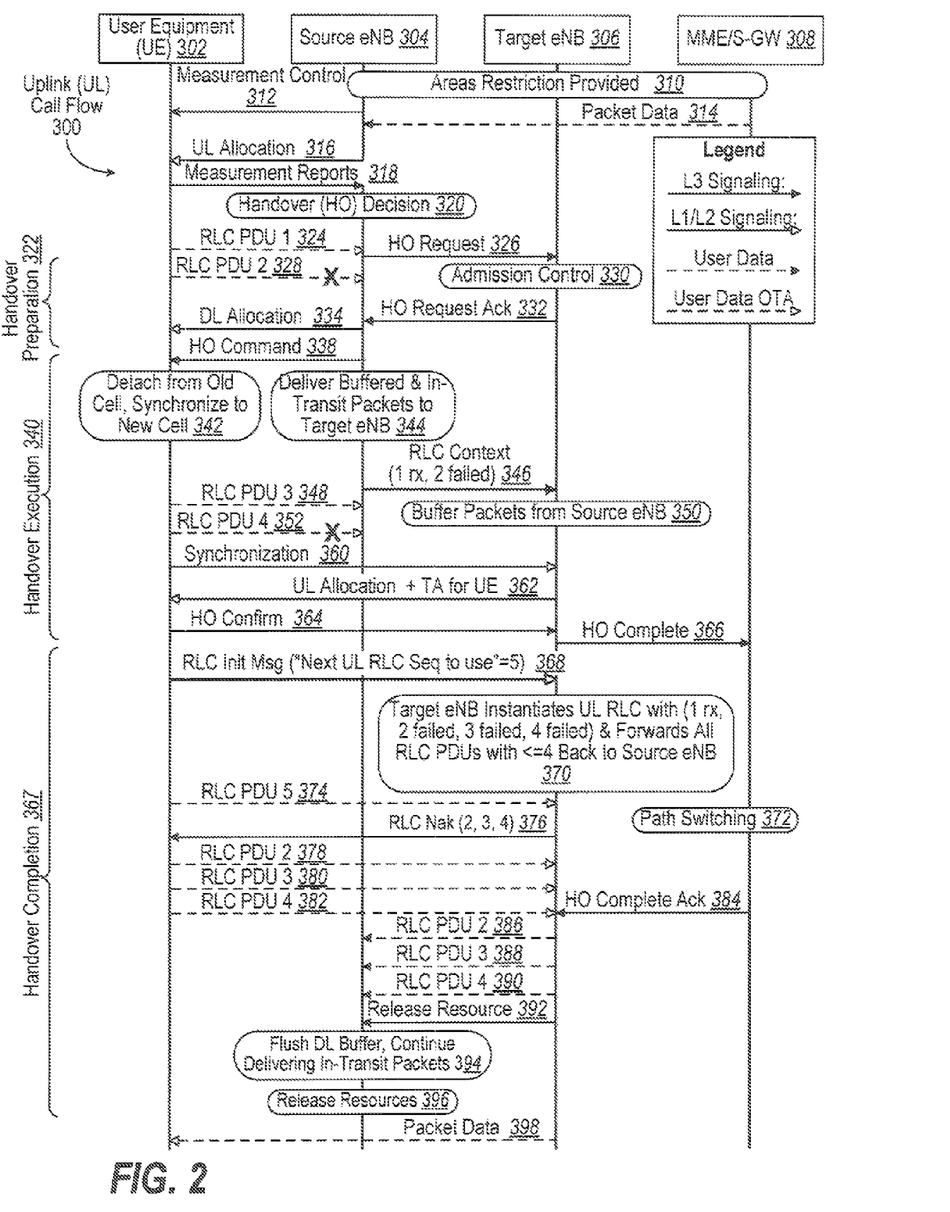
FIG. 2 illustrates a timing diagram of a methodology for hard handover of an uplink over-the-air link with a UE.
Figure 3:
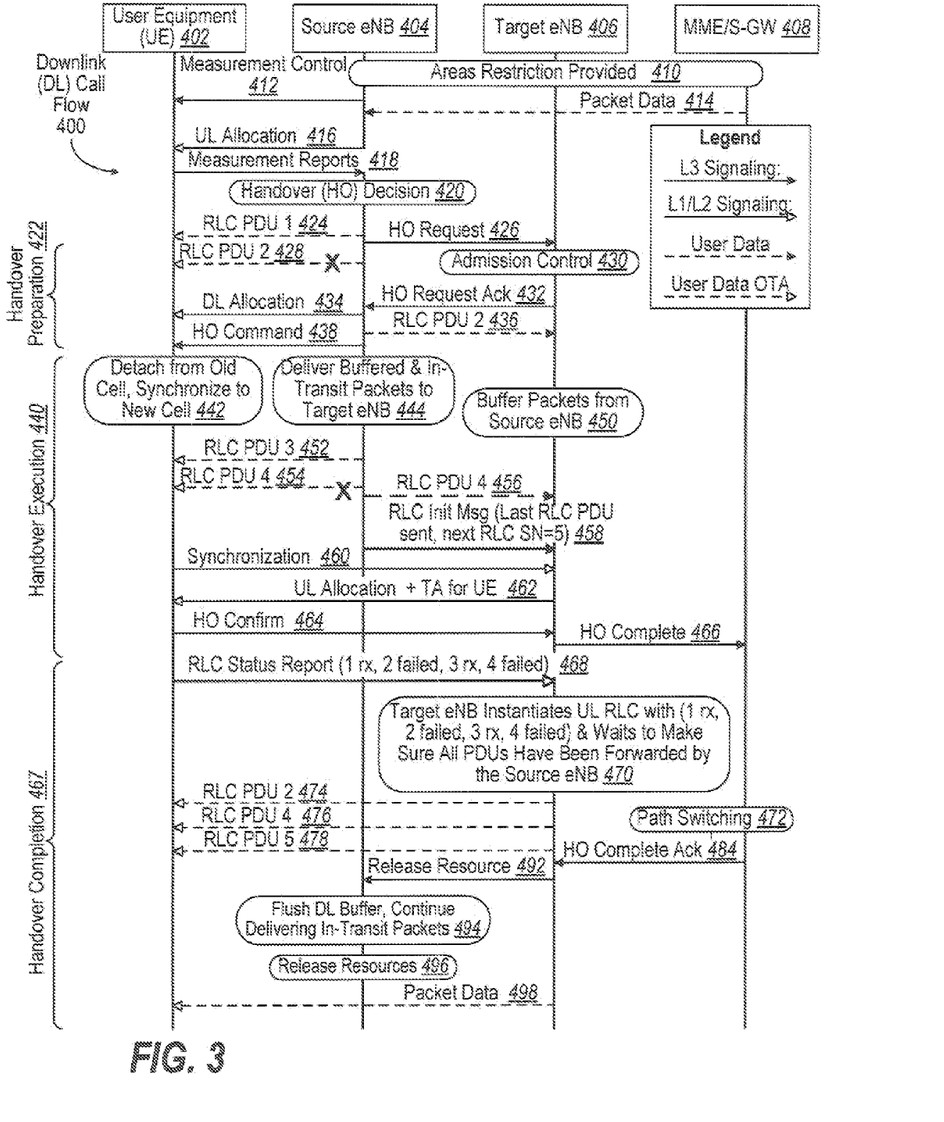
FIG. 3 illustrates a timing diagram of a methodology for hard handover of a downlink over-the-air link with a UE.

FIGS. 2-3 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

In FIG. 2, an uplink (UL) call flow of a methodology 300 is depicted for an intra E-UTRAN handover (HO) of user equipment (UE) 302 in an RRC_CONNECTED state with a source evolved base node (eNB) 304 to a target eNB 306. Network control of the HO is provided by mobility management entities (MME) and serving gateway (S-GW) 308 assisted by the UE 302, thereby that avoiding loss of user data and inefficient retransmission. By not resetting the RLC, no PDCP context transfer is needed. Only the missing segment of the PDCP PDU segments during handover will be retransmitted by the UE 302 to the target eNB 306, and then routed back to the source eNB 304 for decompression and deciphering, which reduces duplication and delay of retransmission over the air (OTA). RLC performs what it is supposed to perform (i.e., recovering any lost RLC PDUs even during handover. Inefficient duplicated functionalities between PDCP and RLC are avoided.

Prior to handover preparation, the methodology 300 proceeds as previously described. Area restriction is provided as depicted at 310 and measurement control as depicted at 312 are imposed by the source eNB 304 upon the UE 302. Packet data communication proceeds as depicted at 314. The source eNB 304 specifies an uplink (UL) allocation as depicted at 316 to the UE 302, which responds with measurement reports as depicted at 318. Based upon these measurement reports, the source eNB 304 makes a handover decision (block 320), thus beginning a handover preparation phase 322. In-transit RLC PDUs on the UL continue, as depicted as the UE 302 sends a successfully received RLC PDU 1 as depicted at 324 while the source eNB 304 makes a handover (HO) request to the target eNB 306 as depicted at 326. Another RLC PDU 2 sent from the UE 302 over the air to the source eNB 304 is not received successfully (i.e., failed) as depicted at 328. Meanwhile, the target eNB 306 is performing admission control (block 330) and responding to the source eNB 304 with a handover (HO) request acknowledgement (Ack) depicted at 332. The source eNB 304 transmits a downlink (DL) allocation as depicted at 334 to the UE 302 and transmits a handover (HO) command as depicted at 338, thus beginning a handover execution phase 340.

The UE 302 detaches from the old cell and synchronizes to the new cell (block 342). The source eNB 304 delivers buffered and in-transit packets to the target eNB 306 (block 344). In particular, as depicted at 346, the source eNB 304 sends RLC context per flow e.g. parameters of IP bearer service such as network internal routing information (e.g., RLC PDU 1 received, RLC PDU 2 failed) to the target eNB 306 via X2 interface. The source eNB RLC need not Nack any RLC PDUs after this point to avoid race conditions. RLC packets from the UE 302 to the source eNB 304 can continue during this time, depicted at 348 as an RLC PDU 3 that is successfully received. Thus, it should be appreciated with the benefit of the present disclosure that RLC context (i.e., depicted at 346) includes partial RLC context from the source eNB 304 to the target eNB 306. In particular, RLC context can mean the reception status of each individual RLC PDU in the receive window in the source eNB 304. The context is partial because by the time the UE 302 handovers to the target eNB 306, the context can be out of date. For example, the partial context as depicted does not capture RLC PDU 3 that succeeded and RLC PDU. Further, the source eNB RLC can skip sending a NACK to the UE 302 regarding the missing RLC PDUs. Alternatively, the source eNB 304 can send a Nack.

Meanwhile, the target eNB 306 buffers packets from the source eNB (block 350). The UE 302 sends an RLC PDU 4 as depicted at 352 that is not successfully received at the source eNB 304. Then, the UE 302 synchronizes to the target eNB 306 as depicted at 360. The target eNB 306 responds at 362 with an uplink allocation and timing advance (TA) for the UE 302. The UE 302 confirms handover at 364 to the target eNB 306, which in turn confirms handover to the EPC (i.e., MME/S-GW 308) at 366, which leads into a handover completion phase 367.

As depicted at 368, the UE 302 sends an RLC Init Msg (i.e., RLC control message) right after RACH. The RLC Init Msg contains the "Next UL RLC SN to use" per flow that the target eNB 306 should use. In block 370, the target eNB 306 then initializes the UL RLC instance with the "Next UL RLC SN to use" and the RLC context received from the source eNB at 346. Meanwhile the EPC (i.e., MME/S-GW 308) performs path switching (block 372).

If the target eNB 306 receives any RLC PDUs before the RLC Init Msg is received from the UE 302, the target eNB 306 buffers the RLC PDUs and waits for the RLC Init Msg before processing the RLC PDUs, depicted at 374 as the UE 302 sending an RLC PDU 5 to the target eNB 306 that is successfully received. With the RLC Init Msg, the target eNB 306 can respond to the UE 302 with an RLC Nak for PDUs 2, 3 and 4 as depicted at 376, indicating which RLC PDUs need to be transmitted. The UE 302 then need only retransmit the failed RLC PDUs, depicted as an RLC PDU 2 at 378, an RLC PDU 3 at 380, and RLC PDU 4 at 382. For all RLC PDUs that were destined for the source eNB 304, the UE 302 can resegment them if needed due to insufficient bandwidth (BW) offered by the target eNB medium access channel (MAC) since the RLC PDUs have already been formed before the target eNB 306 MAC asks for RLC PDUs. This is suggested by retransmitting RLC PDU 3 at 380 although previously received and forwarded by the source eNB 304.

At some point, the MME/S-GW 308 acknowledges handover complete as depicted at 384 to the target eNB 306. In order to mitigate detrimental effects of a failed handover, the target eNB 306 relays via the X2 interface the UL RLC PDUs to the source eNB 304, as depicted respectively at 386, 388 and 390. RLC PDU 3 can be dropped by the source eNB 304 as a duplicated RLC PDU. In particular, in this example, the RLC PDU is duplicated transmission to the target eNB since it was received by the source eNB 304 after the RLC status report at 346.

It should thus be appreciated with the benefit of the present disclosure that the target eNB 306 can use information from the RLC Init Msg depicted at 368 combined with information RLC partial context depicted at 346 to construct an approximation of the full RLC receiver status. The target eNB 306 can use this approximation to decide which RLC PDUs are to be forwarded back to the source eNB 304 and which are to be processed locally in the UL RLC. Thus, as depicted, the target eNB 306 forwards all RLC PDUs with SN<5 to the source eNB 304.

The target eNB 306 can transmit release resources at 392 to the source eNB 304, which responds in block 494 by flushing a downlink buffer while continuing to deliver any remaining in-transit packets. In block 496, the source eNB 304 releases resources. Thereafter data packets over the air proceed between the UE 302 and the target eNB 306 as depicted at 398. It should be appreciated with the benefit of this disclosure that to guarantee delivery of PDCP SDUs in order, a timer can be used. This timer is set after all of the missing RLC PDUs to the source eNB 304 have been received at the target eNB 306 (e.g., after RLC PDU 4 at 382). The target eNB 306 does not forward any RLC PDUs (e.g., SN≧5) when the timer is running. The timer value can be approximately equal to the one-way X2 delay. Thus, it should be appreciated with the benefit of the present disclosure that the timer ensures that RLC PDUs routed to the source eNB 304 arrive at serving gateway (S-GW) prior to the ones routed through the target eNB 306.

In FIG. 3, a downlink (DL) call flow of a methodology 400 is depicted for an intra E-UTRAN handover (HO) of user equipment (UE) 402 in an RRC_CONNECTED state with a source evolved base node (eNB) 404 to a target eNB 406. Network control of the HO is provided by mobility management entities (MME) and serving gateway (S-GW) 408 assisted by the UE 402, thereby that avoiding loss of user data and inefficient retransmission.

Prior to handover preparation, the methodology 400 proceeds as previously described. Area restriction is provided as depicted at 410 and measurement control as depicted at 412 are imposed by the source eNB 404 upon the UE 402. Packet data communication proceeds as depicted at 414. The source eNB 404 specifies an uplink (UL) allocation as depicted at 416 to the UE 402, which responds with measurement reports as depicted at 418. Based upon these measurement reports, the source eNB 404 makes a handover decision (block 420), thus beginning a handover preparation phase 422. In-transit RLC PDUs on the DL continue, as depicted as the source eNB 404 sends a successfully sends an RLC PDU 1 as depicted at 424 while the source eNB 404 makes a handover (HO) request to the target eNB 406 as depicted at 426. Another RLC PDU 2 sent from the source eNB 404 over the air to the source UE 402 is not received successfully (i.e., failed) as depicted at 428. Meanwhile, the target eNB 406 is performing admission control (block 430) and responding to the source eNB 404 with a handover (HO) request acknowledgement (Ack) depicted at 432. The source eNB 404 transmits a downlink (DL) allocation as depicted at 434 to the UE 402 and transmits a handover (HO) command as depicted at 438, thus beginning a handover execution phase 440.

The UE 402 detaches from the old cell and synchronizes to the new cell (block 442). The source eNB 404 delivers buffered and in-transit packets to the target eNB 406 (block 444). The target eNB 406 buffers packets from the source eNB (block 450). The UE 402 successfully sends an RLC PDU 3 as depicted at 452 and unsuccessfully sends an RLC PDU 4 as depicted at 454 to the source eNB 404. The source eNB 404 in turn forwards the RLC PDU 4 to the target eNB 406 at 456 and sends an RLC Init Msg (Last RLC PDU sent, next RLC SN=5) to the target eNB 406 at 458. It should be appreciated thus with the benefit of the present disclosure that the RLC Init Msg thus indicates the source eNB 404 has finished sending any RLC PDUs to the UE 402. In addition, it indicates the next DL RLC SN that the target eNB 406 is to use so that the target eNB 406 can start delivering IP packets routed from the source eNB 404 to the target eNB 406 using the next DL RLC SN assigned by the source eNB 404.

Then, the UE 402 synchronizes to the target eNB 406 as depicted at 460. The target eNB 406 responds at 462 with an uplink allocation and timing advance (TA) for the UE 402. The UE 402 confirms handover at 464 to the target eNB 406, which in turn confirms handover to the EPC (i.e., MME/S-GW 408) at 466, which leads into a handover completion phase 467.

As depicted at 468, the UE 402 sends an RLC Status Report (1 rx, 2 failed, 3 failed, 4 rx) to the target eNB 406. In block 470, the target eNB 406 then initializes the DL RLC instance with the RLC PDU 1 received, RLC PDU 2 failed, RLC PDU 3 received, RLC PDU 4 failed. It should be appreciated thus with the benefit of the present disclosure that the RLC Status Report indicates to the target eNB 406 which RLC PDUs have been received and which have not. This expedites the DL RLC of the target eNB 406 to retransmit those missing RLC PDUs. The target eNB 406 then waits to make sure that all RLC PDUs have been forwarded by the source eNB 404. Meanwhile the EPC (i.e., MME/S-GW 408) performs path switching (block 472). Based on the approximate RLC context, the target eNB 406 sends the failed RLC PDU 2 at 474, failed RLC PDU 4 at 476, and newly received RLC PDU 5 at 478 to the UE 402.

At some point, the MME/S-GW 408 acknowledges handover complete as depicted at 484 to the target eNB 406. The target eNB 406 can transmit release resources at 492 to the source eNB 404, which responds in block 494 by flushing a downlink buffer while continuing to deliver any remaining in-transit packets. In block 496, the source eNB 404 releases resources. Thereafter data packets over the air proceed between the UE 402 and the target eNB 406 as depicted at 498.

Figure 4:
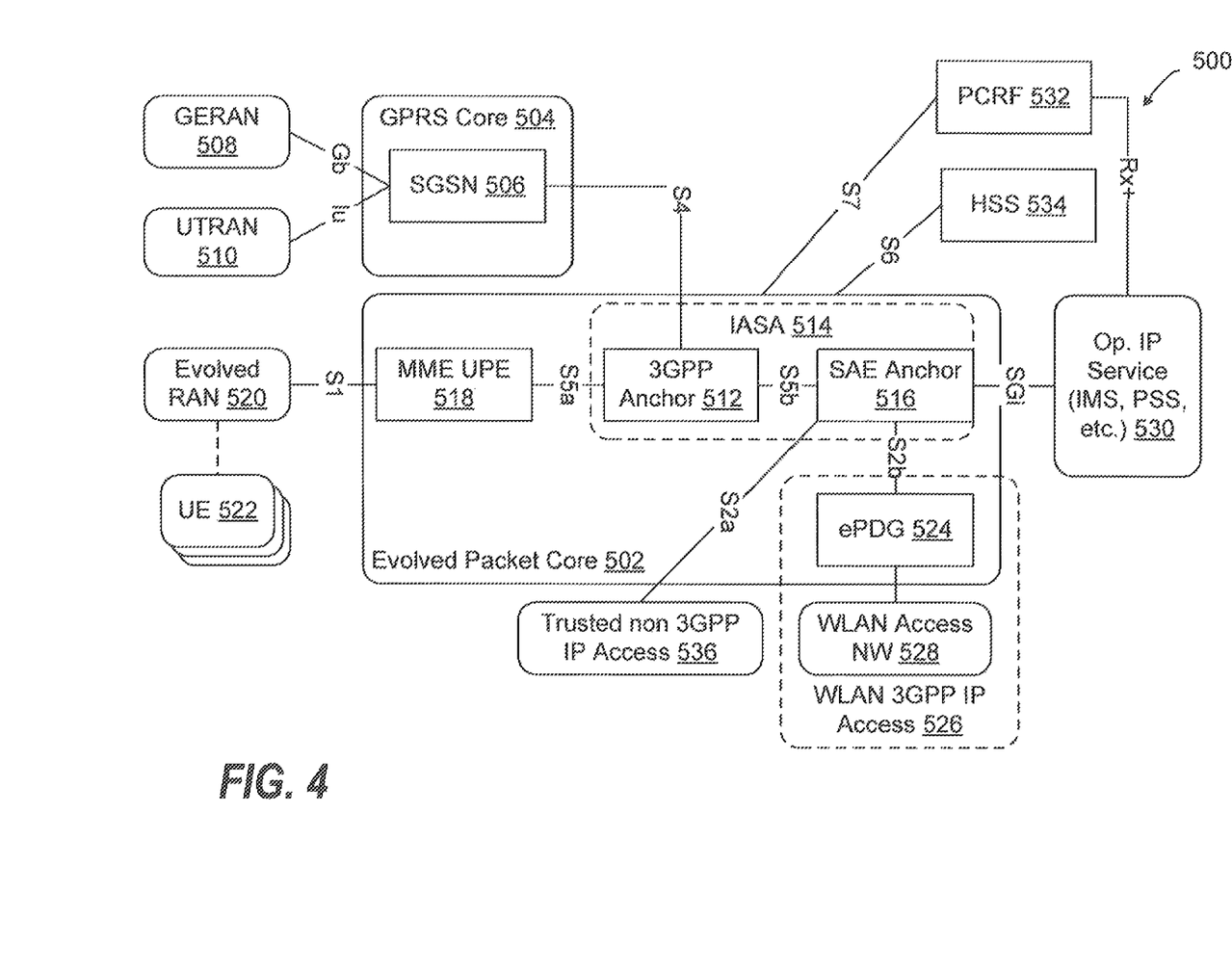
FIG. 4 illustrates a block diagram of a communication system enhanced to support inter-system handovers.

In FIG. 4, in another aspect, a communication system 900 that can encompass the communication system 100 of FIG. 1 includes support for interfacing an evolved packet core 502 via an interface S4 with a legacy General Packet Radio Service (GPRS) core 504, whose Serving GPRS Support Node (SGSN) 506 is interfaced in turn by a Gb interface to a Global System for Mobile Communications (GSM)/Edge Radio Access Network (GERAN) 508 and via an lu interface to a UTRAN 510. The S4 provides the user plane with related control and mobility support between GPRS Core 504 and a 3GPP Anchor 512 of an Inter Access Stratum Anchor (IASA) 514 and is based on a Gn reference point as defined between SGSN 506 and Gateway GPRS Serving/Support Node (GGSN) (not shown). The IASA 514 also includes a system architecture evolved (SAE) anchor 516 interfaced to the 3GPP anchor 512 by an S5b interface that provides the user plane with related control and mobility support. The 3GPP anchor 512 communicates with an MME UPE 518 via interface S5a. Mobility Management entity (MME) pertains to distribution of paging messages to the eNBs and User Plane Entity (UPE) pertains to IP header compression and encryption of user data streams, termination of U-plane packets for paging reasons, and switching of U-plane for support of UE mobility. The MME UPE 518 communicates via interface S1 to an evolved RAN 520 for wirelessly communicating with UE devices 522.

An S2b interface provides the user plane with related control and mobility support between the SAE Anchor 516 and an evolved Packet Data Gateway (ePDG) 524 of a wireless local access network (WLAN) 3GPP IP Access component 526 that also includes a WLAN Access network (NW) 528. An SGi interface is the reference point between the Inter AS Anchor 516 and a packet data network 530. Packet data network 530 may be an operator external public or private packet data network or an intra operator packet data network, e.g. for provision of IP Multimedia Subsystem (IMS) services. This SGi reference point corresponds to Gi and Wi functionalities and supports any 3GPP and non-3GPP access systems. An Rx+ interface provides communication between the packet data network 530 and a policy and charging rules function (PCRF) 532, which in turn communicates via an S7 interface to the evolved packet core 502. The S7 interface provides transfer of (QoS) policy and charging rules from PCRF 532 to Policy and Charging Enforcement Point (PCEP) (not shown). An S6 interface (i.e., AAA interface) enables transfer of subscription and authentication data for authenticating/authorizing user access by interfacing the evolved packet core 502 to a home subscriber service (HSS) 534. An S2a interface provides the user plane with related control and mobility support between a trusted non-3GPP IP access 536 and the SAE Anchor 516.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 5:
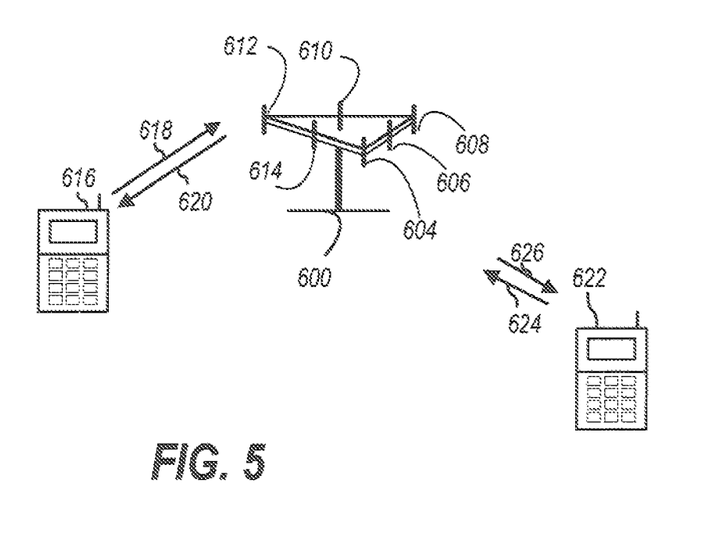
FIG. 5 illustrates a diagram of a multiple access wireless communication system according to one aspect for supporting handovers.

Referring to FIG. 5, a multiple access wireless communication system according to one aspect is illustrated. An access point 600 (AP) includes multiple antenna groups, one including 604 and 606, another including 608 and 610, and an additional including 612 and 614. In FIG. 5, only two antennas are shown for each antenna group, however, more or fewer antennas may be utilized for each antenna group. Access terminal 616 (AT) is in communication with antennas 612 and 614, where antennas 612 and 614 transmit information to access terminal 616 over forward link 620 and receive information from access terminal 616 over reverse link 618. Access terminal 622 is in communication with antennas 606 and 608, where antennas 606 and 608 transmit information to access terminal 622 over forward link 626 and receive information from access terminal 622 over reverse link 624. In a FDD system, communication links 618, 620, 624 and 626 may use different frequency for communication. For example, forward link 620 may use a different frequency then that used by reverse link 618.

Each group of antennas or the area in which they are designed to communicate is often referred to as a sector of the access point. In the aspect, antenna groups each are designed to communicate to access terminals in a sector, of the areas covered by access point 600.

In communication over forward links 620 and 626, the transmitting antennas of access point 600 utilize beamforming in order to improve the signal-to-noise ratio of forward links for the different access terminals 616 and 624. In addition, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 6:
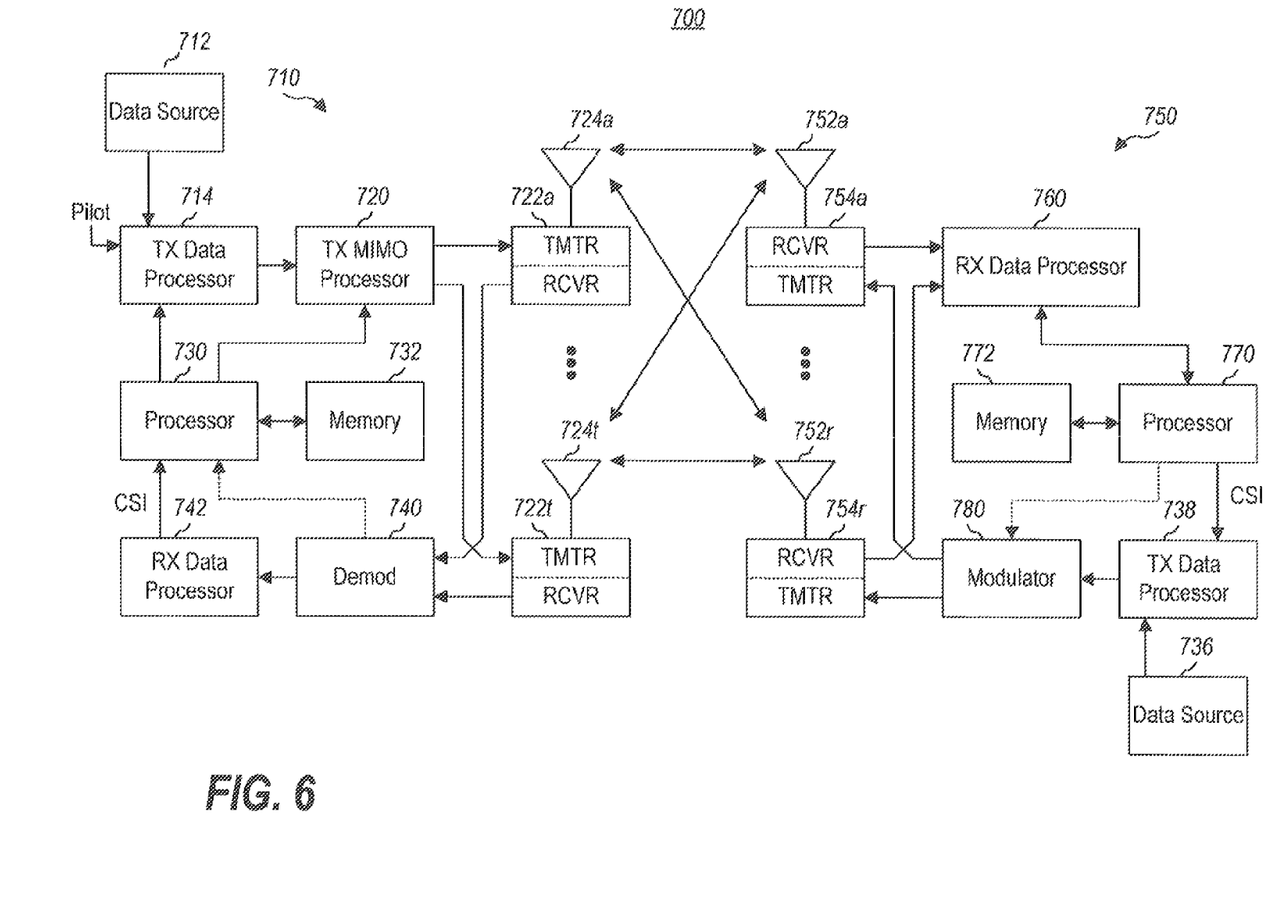
FIG. 6 illustrates a schematic block diagram of a communication system for supporting handover.

FIG. 6 is a block diagram of an aspect of a transmitter system 710 (also known as the access point) and a receiver system 750 (also known as access terminal) in a MIMO system 700. At the transmitter system 710, traffic data for a number of data streams is provided from a data source 712 to a transmit (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain implementations, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 7:
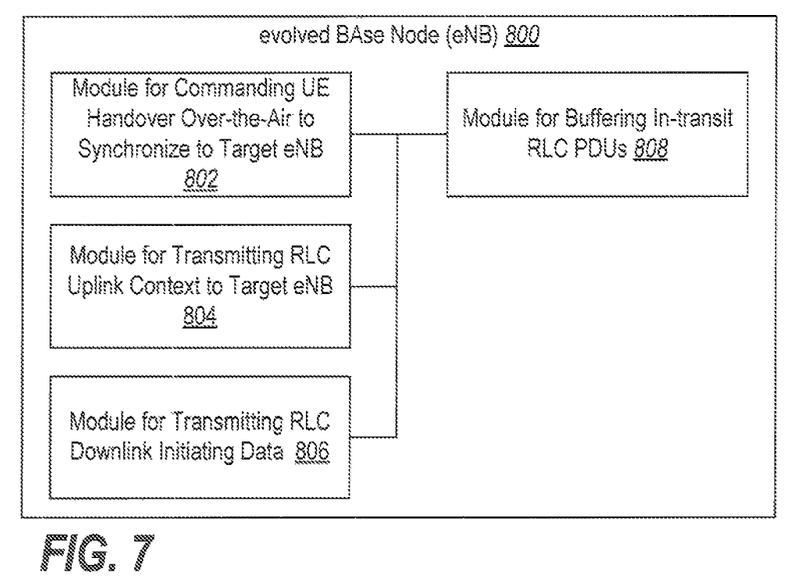
FIG. 7 illustrates a block diagram of an evolved Base Node (eNB) having modules configured to cause a computer to perform the functions for network controlling hard handover.

In FIG. 7, in another aspect, an access node, depicted as an evolved base node 800, includes modules that provide a means to cause a computer to participate in or to perform the methodologies for network-controlled handover in a wireless data packet communication system to avoid user data loss of FIGS. 2-3. A module 802 provides means for sending a handover command to a user equipment (UE) being served by a source node. A module 804 provides means for transmitting RLC Uplink (UL) context from the source node to the target node regarding in-transit RLC packet data units (PDUs). A module 806 provides means for transmitting RLC Downlink (DL) initialization message from the source node to the target node to prompt establishment a new downlink with the UE. A module 808 provides means for buffering in-transit RLC PDUs for transmitting to the target node to prompt the target node to complete downlink transmission of failed RLC PDUs.

Figure 8:
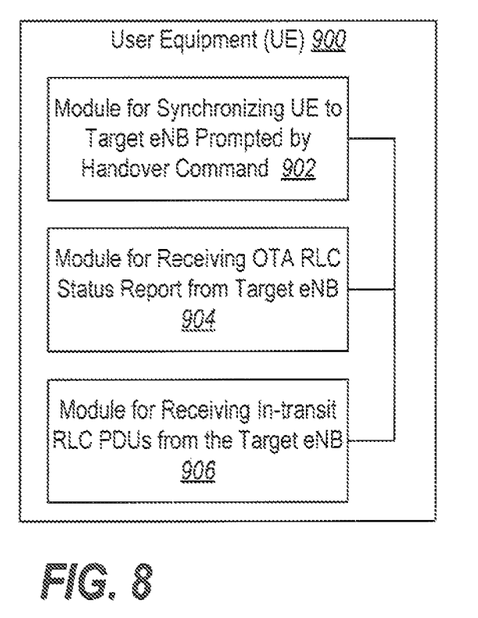
FIG. 8 illustrates a block diagram of user equipment (UE) having modules configured to cause a computer to perform the functions for assisting in hard handover.

In FIG. 8, in another aspect, an access terminal, depicted as user equipment 900, includes modules that provide a means to cause a computer to participate in or to perform the methodologies for user equipment assisted handover in a wireless data packet communication system to avoid user data loss of FIGS. 2-3. A module 902 provides means for synchronizing user equipment (UE) to a target node in response to receiving a handover command from a serving source node. A module 904 provides means for receiving over-the-air an RLC status report from the target node based upon RLC Uplink (UL) context previously transmitted from the source node to the target node regarding in-transit RLC packet data units (PDUs). A module 906 provides means for receiving in-transit RLC PDUs from the target node based upon RLC Downlink (DL) initialization message and buffered in-transit RLC PDUs transmitted from the source node to the target node.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict data traffic conditions and opportunities for facilitating handover to another type of RAT with reduced latency and connection errors based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for user equipment assisted handover in a wireless data packet communication system to avoid user data loss, comprising:
 transmitting over-the-air a Radio Link Control (RLC) status report from a user equipment (UE) to a target node, wherein the RLC status report indicates a receipt status of RLC Packet Data Units (PDUs) previously received from a serving source node;
 receiving in-transit RLC Packet Data Units (PDUs) from the target node based on the RLC status report prior to an acknowledgement of handover completion, wherein the in-transit RLC PDUs were previously transmitted from the serving source node to the target node and not received by the UE; and
 receiving next-in-sequence RLC PDUs from the target node based on a RLC downlink initialization message received by the target node from the serving source node.

2. The method of claim 1, wherein the RLC downlink initialization message indicates to the target node that the serving source node has finished sending the RLC PDUs previously received from the serving source node to the UE and further indicates to the target node a next RLC downlink sequence number the target node is to use.

3. The method of claim 1, wherein at least one of the previously received RLC PDUs, the in-transit RLC PDUs and the next-in-sequence RLC PDUs comprise segmented Packet Data Convergence Protocol (PDCP) Service Data Units (SDUs).

4. The method of claim 1, wherein receiving the in-transit RLC PDUs comprises receiving the in-transit RLC PDUs having a failed receipt status in the RLC status report.

5. The method of claim 1, wherein the RLC status report comprises parameters of Internet Protocol (IP) bearer service network internal routing information for the in-transit RLC PDUs.

6. The method of claim 1, wherein the next-in-sequence RLC PDUs are received from the target node prior to the acknowledgement of handover completion.

7. The method of claim 6, wherein the acknowledgment of handover completion is received at the target node from a serving gateway.

8. At least one processor for user equipment assisted handover in a wireless data packet communication system to avoid user data loss, comprising:
 a first module comprising hardware for transmitting over-the-air a Radio Link Control (RLC) status report from a user equipment (UE) to a target node, wherein the RLC status report indicates a receipt status of RLC Packet Data Units (PDUs) previously received from a serving source node;
 a second module for receiving in-transit RLC Packet Data Units (PDUs) from the target node based on the RLC status report prior to an acknowledgement of handover completion, wherein the in-transit RLC PDUs were previously transmitted from the serving source node to the target node and not received by the UE; and
 a third module for receiving next-in-sequence RLC PDUs from the target node based on a RLC downlink initialization message received by the target node from the serving source node.

9. A computer program product for user equipment assisted handover in a wireless data packet communication system to avoid user data loss, comprising:
 a non-transitory computer-readable storage medium comprising:
  a first set of codes for causing the computer to transmit over-the-air a Radio Link Control (RLC) status report from a user equipment (UE) to a target node, wherein the RLC status report indicates a receipt status of RLC Packet Data Units (PDUs) previously received from a serving source node;
  a second set of codes for causing the computer to receive in-transit RLC Packet Data Units (PDUs) from the target node based on the RLC status report prior to an acknowledgement of handover completion, wherein the in-transit RLC PDUs were previously transmitted from the serving source node to the target node and not received by the UE; and
  a third set of codes for causing the computer to receive next-in-sequence RLC PDUs from the target node based on a RLC downlink initialization message received by the target node from the serving source node.

10. An apparatus for user equipment assisted handover in a wireless data packet communication system to avoid user data loss, comprising:
 means for transmitting over-the-air a Radio Link Control (RLC) status report from a user equipment (UE) to a target node, wherein the RLC status report indicates a receipt status of RLC Packet Data Units (PDUs) previously received from a serving source node;
 means for receiving in-transit RLC Packet Data Units (PDUs) from the target node based on the RLC status report prior to an acknowledgement of handover completion, wherein the in-transit RLC PDUs were previously transmitted from the serving source node to the target node and not received by the UE; and
 means for receiving next-in-sequence RLC PDUs from the target node based on a RLC downlink initialization message received by the target node from the serving source node.

11. An apparatus for user equipment assisted handover in a wireless data packet communication system to avoid user data loss, comprising:
 a transmitter configured to transmit over-the-air a Radio Link Control (RLC) status report from a user equipment (UE) to a target node, wherein the RLC status report indicates a receipt status of RLC Packet Data Units (PDUs) previously received from a serving source node; and
 a receiver configured to:
  receive in-transit RLC Packet Data Units (PDUs) from the target node based on the RLC status report prior to an acknowledgement of handover completion, wherein the in-transit RLC PDUs were previously transmitted from the serving source node to the target node and not received by the UE; and
  receive next-in-sequence RLC PDUs from the target node based on a RLC downlink initialization message received by the target node from the serving source node.

12. The apparatus of claim 11, wherein the RLC downlink initialization message indicates to the target node that the serving source node has finished sending the RLC PDUs previously received from the serving source node to the UE and further indicates to the target node a next RLC downlink sequence number the target node is to use.

13. The apparatus of claim 11, wherein at least one of the previously received RLC PDUs, the in-transit RLC PDUs and the next-in-sequence RLC PDUs comprise segmented Packet Data Convergence Protocol (PDCP) Service Data Units (SDUs).

14. The apparatus of claim 11, wherein the receiver is configured to receive the in-transit RLC PDUs having a failed receipt status in the RLC status report.

15. The apparatus of claim 11, wherein the RLC status report comprises parameters of Internet Protocol (IP) bearer service network internal routing information for the in-transit RLC PDUs.

16. The apparatus of claim 11, wherein the next-in-sequence RLC PDUs are received from the target node prior to the acknowledgement of handover completion.

17. The apparatus of claim 16, wherein the acknowledgment of handover completion is received at the target node from a serving gateway.

* * * * *